(12) United States Patent
Jarrar et al.

(10) Patent No.: US 7,716,511 B2
(45) Date of Patent: May 11, 2010

(54) DYNAMIC TIMING ADJUSTMENT IN A CIRCUIT DEVICE

(75) Inventors: Anis M. Jarrar, Austin, TX (US); Colin MacDonald, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1066 days.

(21) Appl. No.: 11/371,142

(22) Filed: Mar. 8, 2006

(65) Prior Publication Data

US 2007/0214377 A1    Sep. 13, 2007

(51) Int. Cl.
*G06F 1/12*      (2006.01)
*H04L 7/00*      (2006.01)

(52) U.S. Cl. ...................................... 713/401
(58) Field of Classification Search .................. 713/401
See application file for complete search history.

(56) References Cited

U.S. PATENT DOCUMENTS

| | | | |
|---|---|---|---|
| 5,498,977 A | 3/1996 | Pickup | |
| 6,566,924 B2 | 5/2003 | Lin et al. | |
| 6,621,315 B2 * | 9/2003 | Heo et al. | 327/158 |
| 6,643,787 B1 | 11/2003 | Zerbe et al. | |
| 6,668,346 B1 | 12/2003 | Schulz et al. | |
| 6,754,840 B2 * | 6/2004 | Poisner | 713/500 |
| 6,952,378 B2 * | 10/2005 | Partsch et al. | 365/189.07 |
| 7,038,971 B2 * | 5/2006 | Chung | 365/189.16 |
| 2003/0141936 A1 | 7/2003 | Staszewski et al. | |
| 2004/0076192 A1 | 4/2004 | Zerbe et al. | |
| 2005/0225365 A1 | 10/2005 | Wood | |

OTHER PUBLICATIONS

Hsu et al., "Design of a High Speed Processor System Bus for Notebook Computers," IEEE Transactions on Advanced Packaging, vol. 23, No. 3, Aug. 2000, pp. 521-529.
International Search Report for correlating PCT Patent Application No. PCT/US 07/61188 dated Mar. 21, 2008.

* cited by examiner

*Primary Examiner*—Thomas Lee
*Assistant Examiner*—Eric Chang

(57) ABSTRACT

A method includes determining a first operational characteristic representative of an operational speed of a circuit device at a first time. The method further includes receiving an input signal at an input of a first latch of the circuit device and receiving an output signal at an input of a second latch of the circuit device. The method additionally includes delaying a clock signal by a first delay to provide a first adjusted clock signal and delaying the clock signal by a second delay to provide a second adjusted clock signal. In one embodiment, the first delay and the second delay are based on the first operational characteristic. The method further includes latching the input signal at the first latch responsive to the first adjusted clock signal and latching the output signal at the second latch responsive to the second adjusted clock signal.

20 Claims, 4 Drawing Sheets

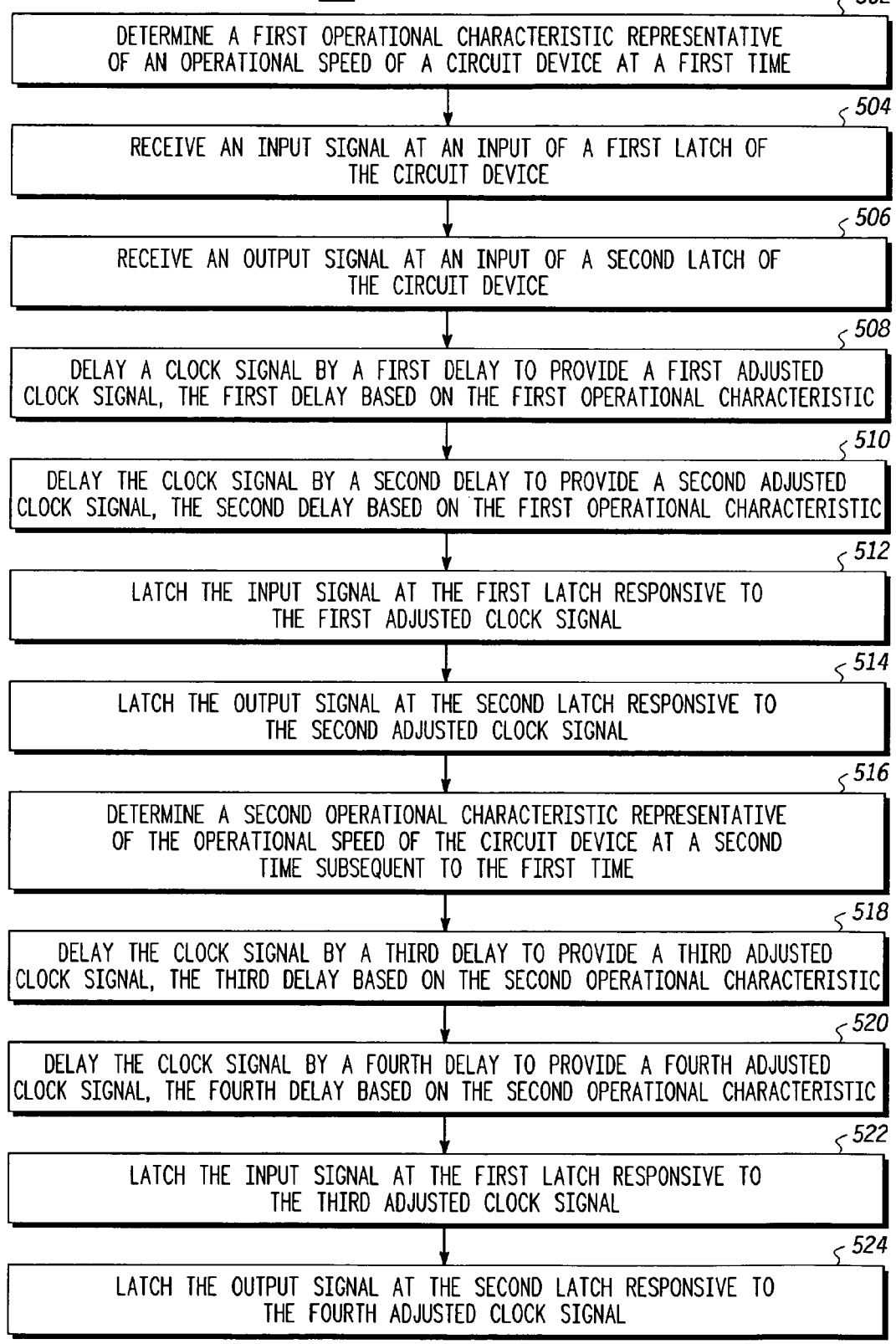

DYNAMIC TIMING ADJUSTMENT IN A CIRCUIT DEVICE

FIELD OF THE DISCLOSURE

The present disclosure is related generally to circuit devices and more specifically to controlling the timing relationships of circuit devices.

BACKGROUND

Variations in the manufacturing process of an integrated circuit device, as well as variations in temperature and voltage during operation of the integrated circuit device (collectively referred to as process-voltage-temperature or PVT) typically result in significant variations in the operational speed of logic of the integrated circuit device. As the operational speed changes, the setup and hold times for various logic components change, thereby typically requiring that other devices that interface with the integrated circuit device be designed toward the worst case scenario for setup and hold times. As a result of these timing constraints, system designers typically are forced to implement more costly, complex and faster interfacing devices. Accordingly, an improved technique for controlling the timing of an integrated circuit device to compensate for PVT variations would be advantageous.

BRIEF DESCRIPTION OF THE DRAWINGS

The present disclosure may be better understood, and its numerous features and advantages made apparent to those skilled in the art by referencing the accompanying drawings.

FIG. 5 is a flow diagram illustrating another exemplary method for dynamic timing adjustment at an integrated circuit device in accordance with at least one embodiment of the present disclosure.

The use of the same reference symbols in different drawings indicates similar or identical items.

DETAILED DESCRIPTION OF THE DRAWINGS

Figure 1:
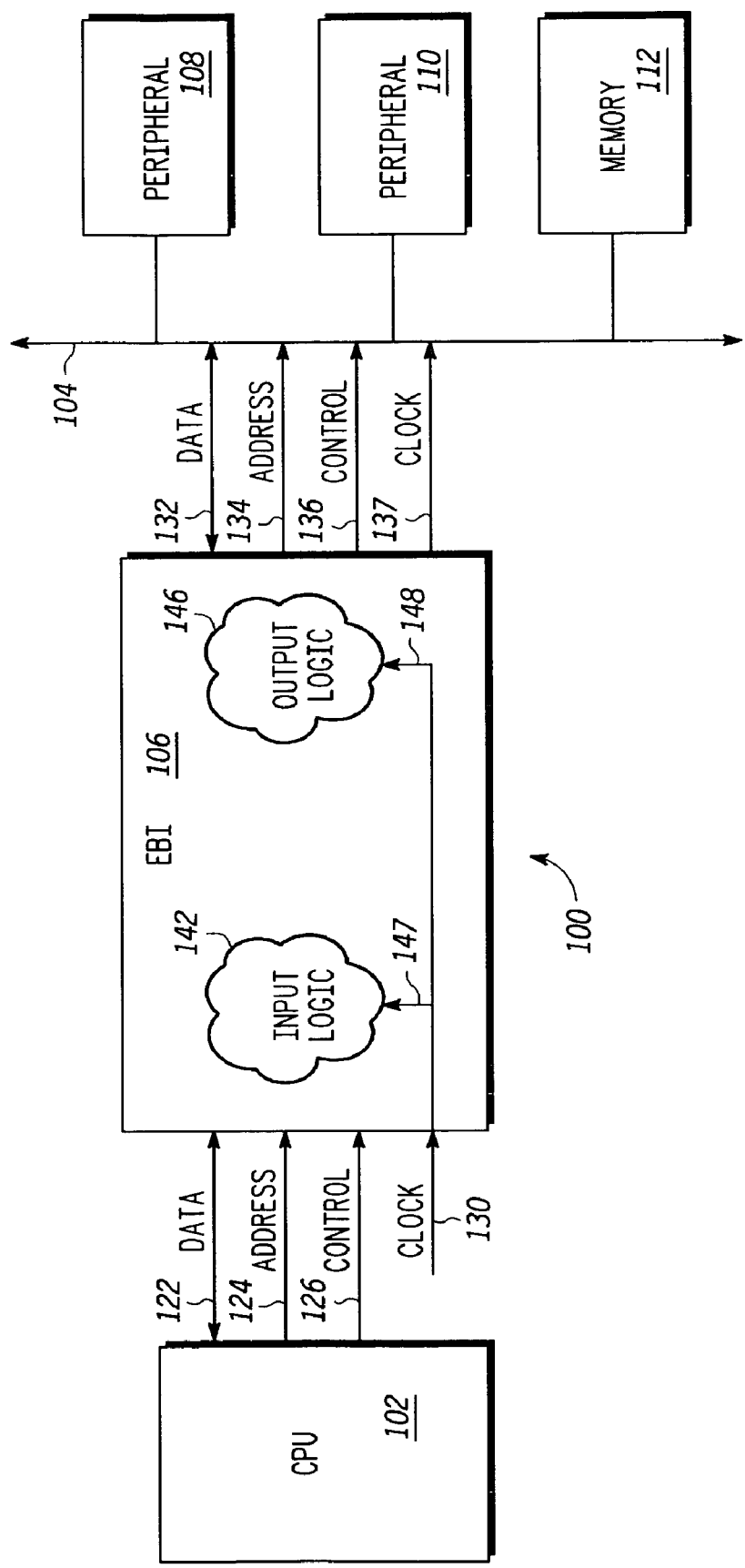
FIG. 1 is a block diagram illustrating an integrated circuit device implementing dynamic input and output timing adjustment in accordance with at least one embodiment of the present disclosure.

In accordance with one aspect of the present disclosure, a method includes determining an operational characteristic representative of an operational speed of a circuit device. The method further includes adjusting a latency of a first clock signal that controls a timing of a first logic of the circuit device based on the operational characteristic. The method further includes adjusting a latency of a second clock signal that controls a timing of a second logic of the circuit device based on the operational characteristic, wherein the second logic is different from the first logic.

In accordance with another aspect of the present disclosure, a method includes determining a first operational characteristic representative of an operational speed of a circuit device at a first time. The method further includes receiving an input signal at an input of a first latch of the circuit device and receiving an output signal at an input of a second latch of the circuit device. The method additionally includes delaying a clock signal by a first delay to provide a first adjusted clock signal and delaying the clock signal by a second delay to provide a second adjusted clock signal. In one embodiment, the first delay and the second delay are based on the first operational characteristic. The method further includes latching the input signal at the first latch responsive to the first adjusted clock signal and latching the output signal at the second latch responsive to the second adjusted clock signal.

In accordance with yet another aspect of the present disclosure, a circuit device includes first logic having an input to receive a first signal and an output and second logic having an input to receive a second signal and an output. The circuit further includes a first latch having an input operably coupled to the output of the first logic, a clock input to receive a first clock signal, and an output to provide a first latched signal responsive to the first clock signal, and a second latch having an input operably coupled to the output of the second logic, a clock input to receive a second clock signal, and an output to provide a second latched signal responsive to the second clock signal. The circuit also includes a first programmable delay cell having an input to receive a third clock signal, a plurality of delay paths having different delays, a select input to receive a signal indicating a selected delay path of the plurality of delay paths, and an output selectively coupled to the input via the selected delay path. The output of the first programmable delay cell is to provide the first clock signal. The circuit device further includes a second programmable delay cell having an input to receive the third clock signal, a plurality of delay paths having different delays, a select input to receive a signal indicating a selected delay path of the plurality of delay paths, and an output selectively coupled to the input via the selected delay path. The output of the second programmable delay cell is to provide the second clock signal. The circuit device additionally includes an operational speed monitor having a first output coupled to the select input of the first programmable delay cell and a second output coupled to the select input of the programmable delay cell. The operational speed monitor is to provide a first value via the first output and a second value via the second output based on an operational characteristic representation of an operational speed of the first logic and the second logic.

FIGS. 1-5 illustrate exemplary techniques for dynamically adjusting the signal timing relationship between logic components of an integrated circuit device so as to compensate for variations in operational speed. In at least one embodiment, an operational speed monitor is utilized to determine changes in the operational speed of the input and output logic based on, for example, variations in manufacturing process, temperature and voltage (i.e., process-voltage-temperature or PVT). Based on an identified operational speed (or change thereof), the timing used to control a first logic (e.g., input logic) and the timing used to control a second logic (e.g., output logic) are adjusted relative to each other and relative to a fixed input or output reference clock. This adjustment is performed to compensate for a deviation of the operational speed from an identified typical or average operational speed, or to compensate for a deviation from a previously measured operational speed, such as the operational speed measured from the immediately previous monitoring period. In at least one embodiment, the timing for the input logic and the output logic is adjusted by adjusting the effective clock latency of clocking signals used to control input latches (also referred to as capture latches) and output latches (also referred to as launch latches).

For ease of discussion, the dynamic timing adjustment techniques at an integrated circuit device disclosed herein are described in the context of an external bus interface (EBI) used to couple a central processing unit (CPU) to an external memory, such as a random access memory (RAM). However, those skilled in the art, using the guidelines provided herein, can implement the disclosed techniques in other integrated circuit devices without departing from the scope of the present disclosure. To illustrate, alternate embodiments may be used to control the gating of inputs to conditional logic circuitry. As another example, the techniques described herein alternately may be used to adjust the timing of circuitry, e.g., by lowering the clocking rate. Further, the techniques of the present disclosure may be used for reducing the power consumption of an integrated circuit (e.g., by lowering the clock rate while still allowing certain timing specifications to be met). Exemplary integrated circuit devices in which the disclosed technique can be implemented include a system on a chip (SOC), an application specific integrated circuit (ASIC), and the like.

Referring to FIG. 1, an exemplary processing system 100 implementing dynamic signal timing adjustment is illustrated in accordance with at least one embodiment of the present disclosure. In the depicted example, the processing system 100 includes a microcontroller having a CPU 102 coupled to a bus 104 via an external bus interface (EBI) 106. Also coupled to the bus 106 are a plurality of components accessible to the CPU 102 via the EBI 106, including peripheral device 108, peripheral device 110 and memory 112. In operation, the CPU 102 submits bus requests to the peripheral devices 108 and 110 and the memory 112 via the EBI 106. Conversely, data and other signaling from the peripheral devices 108 and 110 and the memory 112 are communicated to the CPU 102 via the EBI 106. Accordingly, signaling between the CPU 102 and the EBI 106 can include data signaling 122, address signaling 124, and control signaling 126. Clock signaling typically is generated via a phase locked loop (PLL) and distributed to both CPU 102 and EBI 106. Signaling between the EBI 106 and the bus 104 can include data signaling 132, address signaling 134, control signaling 136, and clock signaling 137.

As illustrated, the EBI 106 includes input logic 142 to process the input signals and output logic 146 to process data for output. In order to control timing, clock signaling 147 is distributed to the input logic 142, and clock signaling 148 is distributed to the output logic 146. The clock signalings 147 and 148, in at least one embodiment, include different delayed representations of the clock signaling 130. To illustrate, the clock signalings 147 and 148 can represent phase-locked loop (PLL) synchronized representations of the clock signaling 130. Further, the clock signalings 147 and 148 may represent frequency-multiplied or frequency-divided versions of the clock signaling 130.

Due to the physical characteristics of their logic components, the operational speed of the input logic 142 and the output logic 146 typically varies in response to changes in temperature of the EBI 106 and to changes in voltage at the EBI 106. Further, manufacturing processing variations may cause the EBI 106 to deviate from the manufacturer's expected or typical operational speed for the same operational voltage and temperature. Likewise, changes in operational temperature or voltage also can cause the EBI 106 to deviate from the typical operational speed. Accordingly, in at least one embodiment, the clock signaling 147 provided to the input logic 142 and the clock signaling 148 provided to the output logic 146 each are dynamically adjusted to compensate for deviations in operational speed from a predetermined operational speed. In one embodiment, the clock signaling is adjusted by introducing latencies into the different representations of the clock signalings 147 and 148 provided to the input logic 142 and the output logic 146 so as to change their effective frequencies. These adjustments in the clock signaling result in changes to the setup and hold times of the input logic 142 and the output logic 146 so that the latency in the input logic 142 complements the latency in the output logic 146, and vice versa.

Figure 2:
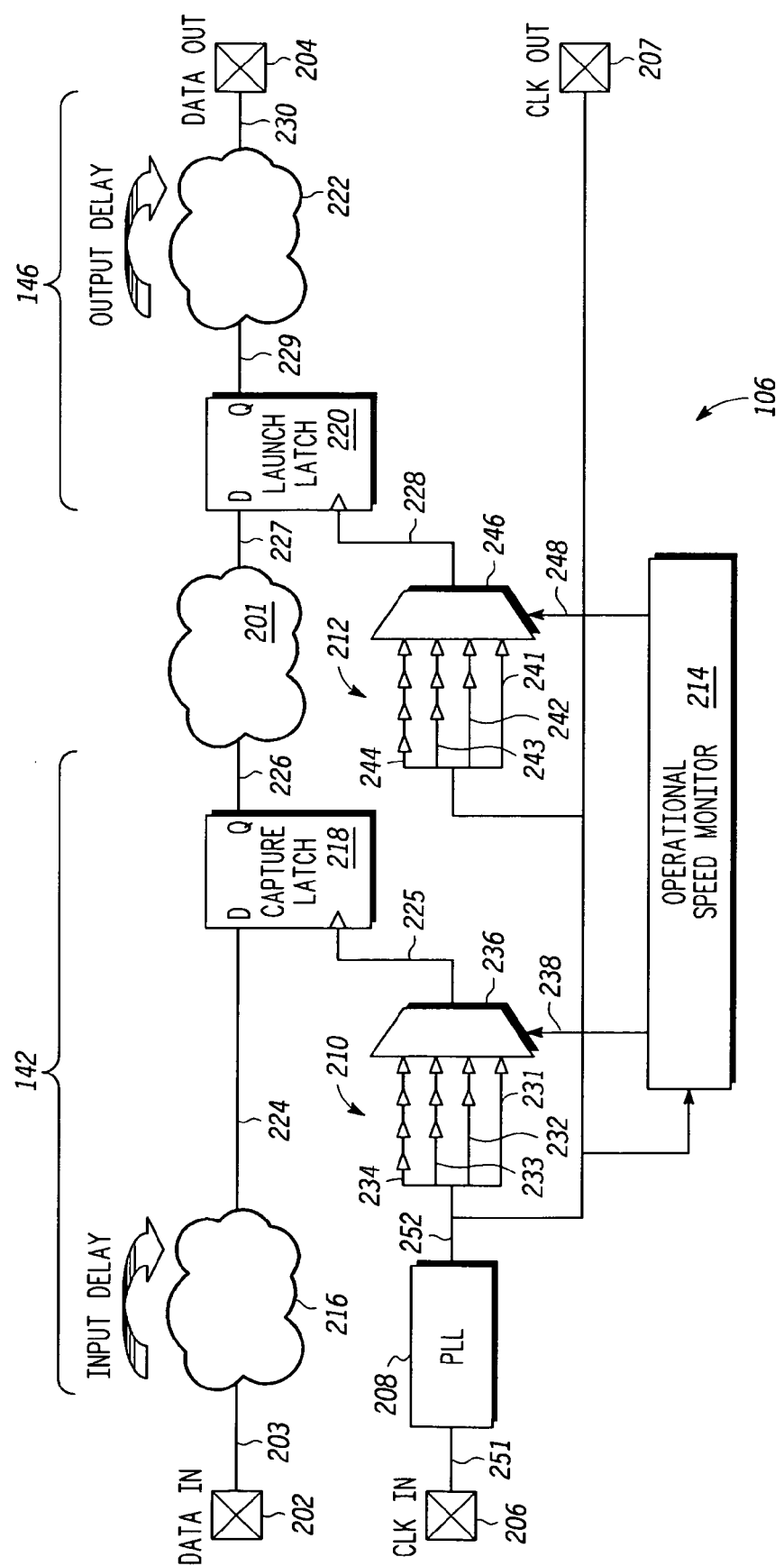
FIG. 2 is a block diagram illustrating the integrated circuit device of FIG. 1 in greater detail.

Referring to FIG. 2, the EBI 106 of FIG. 1 is illustrated in greater detail in accordance with at least one embodiment of the present disclosure. For ease of illustration, the EBI 106 is illustrated in the context of a single data input and a single data output. However, it will be appreciated that multiple data or control inputs and outputs may be implemented in the same manner. In the depicted example, the EBI 106 includes the input logic 142, EBI circuitry 201, the output logic 146, a data signal input 202 (e.g., a die pad or a package pin), a data signal output 204, a clock signal input 206, a clock signal output 207, a phase locked loop (PLL) 208, programmable delay cells 210 and 212, and an operational speed monitor 214. The input logic 142 includes input signal processing/formatting logic 216 and a capture latch 218. The output logic 146 includes a launch latch 220 and output signal processing/formatting logic 222.

The input signal processing/formatting logic 216 of the input logic 142 includes an input connected to the data signal input 202 and an output to provide a processed input signal 224 that includes a formatted or otherwise processed representation of a data signal 203 received via the data signal input 202. The capture latch 218 includes a data input to receive the processed input signal 224, a latch control input to receive a clock signal 225, and a latch output to provide a latched input signal 226 responsive to the clock signal 225. The EBI circuitry 201 includes an input to receive the latched input signal 226 and an output to provide a data signal 227. The launch latch 220 of the output logic 146 includes a data input to receive the data signal 227, a latch control input to receive a clock signal 228 and an output to provide a latched output signal 229 responsive to the clock signal 228. The output signal processing/formatting logic 222 includes an input to receive the latched output signal 229 and an output coupled to the data signal output 204 to provide a processed output data signal 230.

The PLL 208 includes an input coupled to the clock signal input 206 and an output to provide a clock signal 252 that is synchronized to a clock signal 251 received at the input of the PLL 208 via the clock signal input 206. The programmable cell 210 includes delay paths 231, 232, 233 and 234 (delay paths 231-234), each having an input to receive the clock signal 252 and an output to provide a delayed representation of the clock signal 252. Each of the delay paths 231-234 introduces a different amount of latency into the clock signal 252. The programmable cell 210 further includes a multiplexer 236 having a plurality of inputs, each input coupled to the output of a corresponding one of delay paths 231-234, a mux select input to receive a mux control signal 238, and an output to provide the clock signal 225, where the clock signal 225 is selected from the delayed clock signals provided by the delay paths 231-234 based on the mux control signal 238. Similarly, the programmable cell 212 includes delay paths 241, 242, 243 and 244 (delay paths 241-244), each having an input to receive the clock signal 252 and an output to provide a delayed representation of the clock signal 252. As with the delay paths 231-234, each of the delay paths 241-244 introduces a different amount of latency into the clock signal 252. In at least one embodiment, the delay in each of the delay paths 241-244 is substantially equal to the delay in a corresponding one of the delay paths 231-234. The programmable cell 212 further includes a multiplexer 246 having a plurality of inputs, each input coupled to the output of a corresponding one of delay paths 241-244, a mux select input to receive a control mux signal 248, and an output to provide the clock signal 228, where the clock signal 228 is selected from the delayed clock signals provided by the delay paths 241-244 based on the mux control signal 248.

In the illustrated example, the delay paths 231-234 and the delay paths 241-244 are implemented as series of different numbers of inverters. However, those skilled in the art can utilize other techniques for introducing a variable delay into the clock signal 252 without departing from the scope of the present disclosure. Moreover, although the programmable cells 210 and 212 are illustrated as each having four delay paths for ease of discussion, it will be appreciated that fewer than four or more than four (e.g., sixty-four) delay paths may be utilized as appropriate.

The operational speed monitor 214 includes a first output to provide the mux control signal 238 and a second output to provide the mux control signal 248. In at least one embodiment, the operational speed monitor 214 monitors at least one operating characteristic of the EBI 106 so as to determine the operating speed of the input logic 142 and the output logic 146. Based on the determined operating speed, the operational speed monitor 214 can adjust the value of the mux control signal 238 so as to control which delayed clock signal is selected by the multiplexer 236 for output as the clock signal 225, and thereby dynamically adjusting the timing of the capture latch 218. Likewise, the operational speed monitor 214 can dynamically adjust the timing of the launch latch 220 by adjusting the value of the mux control signal 248 based on the determined operational speed so as to control which delayed clock signal is selected by the multiplexer 246 for output as the clock signal 228.

As described in greater detail with reference to FIG. 3, the operational speed monitor 214 can determine a relative operational speed of the input logic 142 and output logic 146 by comparing the frequency of a clock signal generated by a clock generation component of the EBI 106 with an external clock signal (e.g., clock signal 251 or 252) received at the EBI 106 from another device. As the clock generation component typically is formed under the same or similar manufacturing process as the other components of the EBI 106 and as it is operating at a temperature and voltage that is substantially the same as the rest of the components of the EBI 106, the frequency of the clock signal generated by the clock generation component typically is influenced by the PVT point of the EBI 106 in the same manner as the input logic 142 and the output logic 146. Thus, changes in the frequency of the clock signal generated by the clock generation component relative to the external clock signal may be used as an indicator of the relative operational speed of the input logic 142 and the output logic 146. The operational speed monitor 214 therefore can utilize the ratio of the frequency of the internally generated clock signal to the frequency of the external clock signal to enact adjustments in the latency introduced into the clock signal 225 and the clock signal 228 so as to compensate for the changes in operational speed. To reduce or eliminate variability introduced by across chip device variation, the operational speed monitor 214 can be placed in close physical proximity to the other components of the EBI 106.

In at least one embodiment, the adjustments to the timings of the capture latch 218 and the adjustment to the timing of the launch latch 220 by the operational speed monitor 214 are complementary so as to compensate for a deviation in the determined operational speed from a predetermined operational speed (e.g., a typical or normal operational speed). To illustrate, when the actual operational speed is lower than the typical operational speed, the operational speed monitor 214 can control the programmable delay cell 210 to increase the latency in the clock signal 225 so as to improve the setup times for the input logic 142. The operational speed monitor 214 further can control the programmable delay cell 212 to decrease the latency in the clock signal 228 so as to improve the external setup times for the output logic 146. Conversely, when the actual operational speed is higher than the typical operational speed, the operational speed monitor 214 can control the programmable delay cell 210 to decrease the latency in the clock signal 225 so as to improve the hold times for the input logic 142. The operational speed monitor 214 also can control the programmable delay cell 212 to increase the latency in the clock signal 228 so as to improve the hold times for the output logic 146. In the event that the actual operational speed is substantially equal to the predetermined operational speed, the operational speed monitor 214 can maintain the latencies in the clock signal 225 and the clock signal 228.

Figure 3:
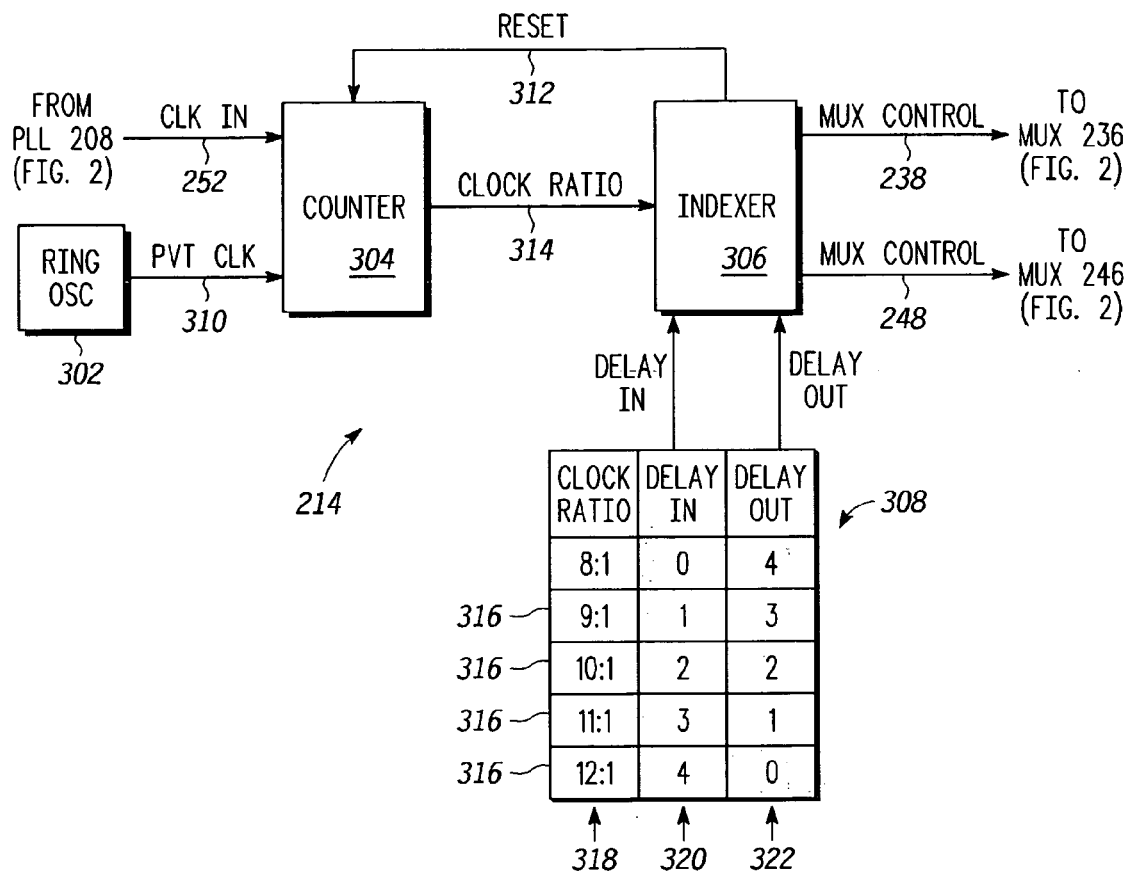
FIG. 3 is a block diagram illustrating an operational speed monitor for use in dynamic timing adjustment in accordance with at least one embodiment of the present disclosure.

Referring to FIG. 3, an exemplary implementation of the operational speed monitor 214 is illustrated in accordance with at least one embodiment of the present disclosure. In the depicted example, the operational speed monitor 214 includes a ring oscillator 302, a counter 304, an indexer module 306 and a lookup table 308.

The ring oscillator 302 generates and provides a PVT clock signal 310. As the ring oscillator 302 is implemented at or in close proximity to the EBI 106 (FIG. 2), the frequency of the PVT clock signal 310 is dependent on the PVT point at which the EBI 106 is operating. The counter 304 includes a first input to receive the clock signal 252 output by the PLL 208 (FIG. 2), a second input to receive the PVT clock signal 310, and a third input to receive a reset signal 312. In response to an assertion of the reset signal 312, the counter 304 resets and begins to count the number of clock cycles of the PVT clock signal 310 that occur during a predetermined number of clock cycles (e.g., one hundred clock cycles) of the clock signal 252. Thus, the clock cycle count (clock ratio signal 314) generated by the counter 304 represents a ratio of the frequency of the PVT clock signal 310 to the clock signal 252.

As noted above, the frequency of the PVT clock signal 310 is influenced by the PVT point of the EBI 106, whereas the frequency of the clock signal 252, being a representation of the clock signal 251 (FIG. 2) provided from a device external to the EBI 106, is substantially independent of the PVT point of the EBI 106. Accordingly, changes in the clock ratio as represented by the clock cycle count can represent relative changes in the PVT of the EBI 106 due to changes in the PVT point of the EBI 106. To illustrate, assume that the clock signal 252 has a frequency of 100 megahertz (100 MHz), whereas the PVT clock signal 310 has a frequency of 1 gigahertz (1 GHz) when the EBI 106 is operating at the typical PVT point. Thus, the clock ratio signal 314 output by the counter 304 when the EBI 106 is at the typical PVT point represents a clock ratio of approximately 10:1. Assume that the PVT point of the EBI 106 changes due to an increase in temperature. This increase in temperature results in a slowing of the operational speed of the ring oscillator 302, which results in a reduction in the frequency of the PVT clock signal 310 to, for example, 900 MHz. In this instance, the clock ratio would change to approximately 9:1, thereby indicating that the operational speed of the EBI 106 has slowed below the typical PVT point. Conversely, a decrease in the temperature of the EBI 106 results in an increase in the operating speed of the ring oscillator 302, which results in an increase in the frequency of the operational speed clock signal 310 to, for example, 1.1 GHz. In this instance, the clock ratio would change to approximately 11:1, thereby indicating that the operational speed of the EBI 106 has increased above the typical PVT point.

In the illustrated example, the lookup table 308 includes a plurality of entries 316 indexed (index value 318) by the indexer module 306 based on the clock ratio represented by the clock ratio signal 314. Each entry 316 includes an input delay value 320 representative of the delay to be introduced into the signal 225 (FIG. 2) by the programmable delay cell 210 (FIG. 2) and an output delay value 322 representative of the delay to be introduced into the signal 228 (FIG. 2) by the programmable delay cell 212 (FIG. 2). In at least one embodiment, the input delay value 320 can include a mux select value output by the indexer module 306 as the mux control signal 238 so as to direct the multiplexer 236 (FIG. 2) to select one of the delay paths 231-234 that would introduce the indicated input latency into the clock signal 225. Likewise, the output delay value 322 includes a mux select value output by the indexer module 306 as the mux control signal 248 so as to direct the multiplexer 246 (FIG. 2) to select one of the delay paths 241-244 that would introduce the indicated output latency into the clock signal 228. After supplying the mux select values for the mux control signal 238 and the mux control signal 248 in response to the clock ratio signal 314, the indexer module 306 asserts the reset signal 312 to reset the counter 304 for the next monitoring period.

Figure 4:
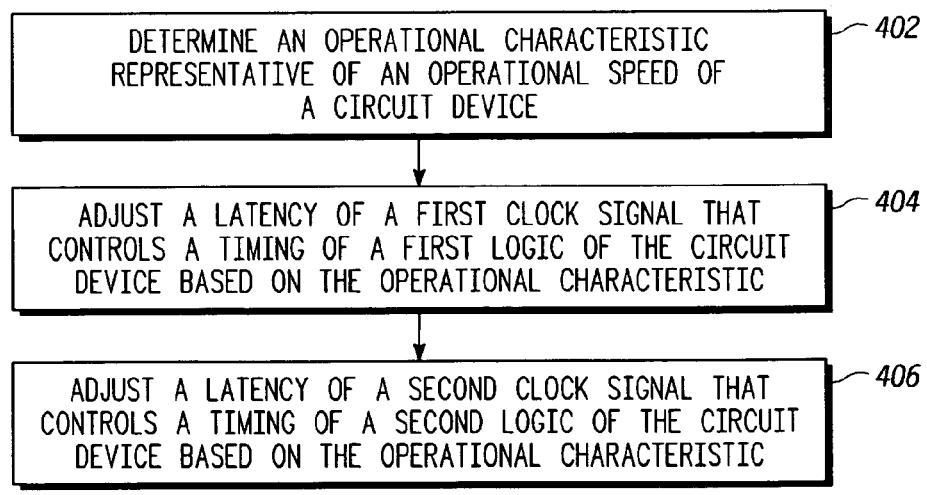
FIG. 4 is a flow diagram illustrating an exemplary method for dynamic timing adjustment at an integrated circuit device in accordance with at least one embodiment of the present disclosure.

Referring to FIG. 4, an exemplary method 400 for dynamically adjusting the timing relationship between logic of a circuit device is illustrated in accordance with at least one embodiment of the present disclosure. The method 400 includes determining an operational characteristic representative of an operational speed of a circuit device at block 402. As described with reference to FIG. 3, the operational characteristic can include a comparison or ratio of the frequency of a clock signal generated at the circuit device, such as by a ring oscillator, with the frequency of an externally-supplied clock signal.

At block 404, the method 400 includes adjusting a latency of a first clock signal that controls a timing of a first logic of the circuit device based on the operational characteristic. The first logic can include, for example, input logic of the circuit device. At block 406, the method 400 includes adjusting a latency of a second clock signal that controls a timing of a second logic of the circuit device based on the operational characteristic. The second logic can include, for example, output logic of the circuit device.

In at least one embodiment, when the operational characteristic indicates that the operational speed is below an identified value, adjusting the latency of the first clock signal at block 404 can include increasing the latency of the first clock signal and adjusting the latency of the second clock signal at block 406 can include decreasing the latency of the second clock signal. Conversely, when the operational characteristic indicates that the operational speed is above an identified value, adjusting the latency of the first clock signal at block 404 can include decreasing the latency of the first clock signal and adjusting the latency of the second clock signal at block 406 can include increasing the latency of the second clock signal. The identified value can include, for example, a predetermined typical or normalized operational speed or a previously determined operational speed of the circuit device. As described with reference to FIG. 2, the latencies of the first clock signal and the second clock signal can be adjusted using programmable delay cells. Note that the adjustment to the input and output clock latencies typically occur when the EBI 106 is idle, indicating no data transfer is in progress.

Referring to FIG. 5, an exemplary method 500 for dynamically adjusting the clock signaling used to control latching at a circuit device is illustrated in accordance with at least one embodiment of the present disclosure. The method 500 includes determining a first operational characteristic representative of an operational speed of a circuit device at a first time at block 502. In one embodiment, the operational characteristic is determined based on changes in the frequency of a clock signal generated at the circuit device. At block 504, the method 500 includes receiving an input signal at an input of a first latch of the circuit device. The method 500 further includes receiving an output signal at an input of a second latch of the circuit device at block 506.

At block 508, the method 500 includes delaying a clock signal by a first delay to provide a first adjusted clock signal. At block 510, the method 500 includes delaying the clock signal by a second delay to provide a second adjusted clock signal. The first delay and the second delay are based on the first operational characteristic. In one embodiment, the first delay is greater than the second delay when the first operational characteristic indicates that the operational speed is greater than an identified operational speed, and the second delay is greater than the first delay when the operational speed is less than an identified operational speed. Further, the first delay is substantially equal to the second delay when the first operational characteristic indicates that the operational speed is substantially equal to the identified operational speed. The identified operational speed can include a second operational speed of the circuit device at a second time prior to the first time. Alternately, the identified operational speed can include a typical or normal operational speed. The method 500 further includes latching the input signal at the first latch responsive to the first adjusted clock signal at block 512 and latching the output signal at the second latch responsive to the second adjusted clock signal at block 514.

The method 500 additionally includes determining a second operational characteristic representative of the operational speed of the circuit device at a second time subsequent to the first time at block 516. At block 518, the method 500 includes delaying the clock signal by a third delay to provide a third adjusted clock signal. At block 520, the method 500 includes delaying the clock signal by a fourth delay to provide a fourth adjusted clock signal. The third delay and the fourth delay are based on the second operational characteristic. The method 500 additionally includes latching the input signal at the first latch responsive to the third adjusted clock signal at block 522 and latching the output signal at the second latch responsive to the fourth adjusted clock signal.

Although the exemplary techniques of the present disclosure are described herein as used to adjust the speed of circuitry in an EBI, alternate embodiments may be used to adjust the speed of circuits used in any way in any integrated circuit. Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
providing a bus interface coupled to a processing unit and coupled to a memory and at least one peripheral device via a bus, the bus interface comprising a first latch, a second latch, and a first logic, the first latch receiving a first signal and providing a first latched signal, the second latch receiving a second signal and providing a second latched signal, and the first logic receiving the first latched signal from the first latch and providing the second signal to the second latch;
determining an operational characteristic representative of an operational speed of the bus interface;
adjusting a latency of a first clock signal that controls a timing of the first latch based on the operational characteristic; and
adjusting a latency of a second clock signal that controls a timing of the second latch based on the operational characteristic.

2. The method of claim 1, wherein determining the operational characteristic comprises:
generating a third clock signal via a ring oscillator at the bus interface;
determining a clock ratio based on a comparison of a frequency of the third clock signal with a frequency of a fourth clock signal, wherein the first clock signal and second clock signal are based on the fourth clock signal; and
wherein the operational characteristic is based on the clock ratio.

3. The method of claim 1, wherein adjusting the latency of the first clock signal comprises increasing the latency of the first clock signal and wherein adjusting the latency of the second clock signal comprises decreasing the latency of the second clock signal when the operational characteristic indicates that the operational speed is below an identified value.

4. The method of claim 3, wherein adjusting the latency of the first clock signal comprises decreasing the latency of the first clock signal and wherein adjusting the latency of the second clock signal comprises increasing the latency of the second clock signal when the operational characteristic indicates that the operational speed is above an identified value.

5. The method of claim 4, wherein the identified value is representative of a previously determined operational speed of the bus interface.

6. The method of claim 4, wherein the identified value is representative of an operational speed of the bus interface under expected operating conditions.

7. The method of claim 1, wherein the latency of the first clock signal is adjusted via a first programmable delay cell and the latency of the second clock signal is adjusted via a second programmable delay cell.

8. The method of claim 1, wherein the latency of the first clock signal and the latency of the second clock signal are adjusted substantially simultaneously.

9. A method comprising:
determining a first operational characteristic representative of an operational speed of a circuit device at a first time;
receiving an input signal at an input of a first latch of the circuit device;
receiving an output signal at an input of a second latch of the circuit device, the output signal based on an output of the first latch;
delaying a clock signal by a first delay to provide a first adjusted clock signal, the first delay based on the first operational characteristic;
delaying the clock signal by a second delay to provide a second adjusted clock signal, the second delay based on the first operational characteristic;
latching the input signal at the first latch responsive to the first adjusted clock signal; and
latching the output signal at the second latch responsive to the second adjusted clock signal.

10. The method of claim 9, further comprising:
determining a second operational characteristic representative of the operational speed of the circuit device at a second time subsequent to the first time;
delaying the clock signal by a third delay to provide a third adjusted clock signal, the third delay based on the second operational characteristic;
delaying the clock signal by a fourth delay to provide a fourth adjusted clock signal, the fourth delay based on the second operational characteristic;
latching the input signal at the first latch responsive to the third adjusted clock signal; and
latching the output signal at the second latch responsive to the fourth adjusted clock signal.

11. The method of claim 9, wherein the operational characteristic is determined based on a change in a frequency of a clock signal generated at the circuit device.

12. The method of claim 9, wherein:
the first delay is greater than the second delay when the first operational characteristic indicates that the operational speed is greater than an identified operational speed; and
the second delay is greater than the first delay when the first operational characteristic indicates that the operational speed is less than the identified operational speed.

13. The method of claim 12, wherein the identified operational speed comprises a second operational speed of the circuit device at a second time prior to the first time.

14. The method of claim 12, wherein the first delay is substantially equal to the second delay when the first operational characteristic indicates that the operational speed is substantially equal to the identified operational speed.

15. A system comprising:
first logic having an input to receive a first signal and an output;
second logic having an input to receive a second signal and an output;
a first latch having an input operably coupled to the output of the first logic, a clock input to receive a first clock signal, and an output to provide a first latched signal responsive to the first clock signal, wherein the second signal is based on the first latched signal;
a second latch having an input operably coupled to the output of the second logic, a clock input to receive a second clock signal, and an output to provide a second latched signal responsive to the second clock signal;
a first programmable delay cell having an input to receive a third clock signal, a plurality of delay paths having different delays, a select input to receive a signal indicating a selected delay path of the plurality of delay paths, and an output selectively coupled to the input via the selected delay path, wherein the output of the first programmable delay cell is to provide the first clock signal;
a second programmable delay cell having an input to receive the third clock signal, a plurality of delay paths having different delays, a select input to receive a signal indicating a selected delay path of the plurality of delay paths, and an output selectively coupled to the input via the selected delay path, wherein the output of the second programmable delay cell is to provide the second clock signal; and an operational speed monitor having a first output coupled to the select input of the first programmable delay cell and a second output coupled to the select input of the programmable delay cell, wherein the operational speed monitor is to provide a first value via the first output and a second value via the second output based on an operational characteristic representation of an operational speed of the first logic and the second logic.

16. The system of claim 15, wherein operational speed monitor comprises:

a ring oscillator having an output to provide a fourth clock signal; and a counter having a first input coupled to the output of the ring oscillator, a second input to receive the third clock signal, and an output to provide a counter value representative of a ratio of a frequency of the fourth clock signal to a frequency of the third clock signal, wherein the operational characteristic comprises the counter value.

17. The system of claim 16, further comprising:

a lookup table comprising a plurality of entries indexed by the counter value, each entry comprising a value for output via the first output of the operational speed monitor and a value for output via the second output of the operational speed monitor.

18. The system of claim 15, wherein the input of the first logic comprises an input of the circuit device and the output of the second logic comprises an output of the circuit device.

19. The system of claim 15, wherein the circuit device comprises a bus interface.

20. The system of claim 19, wherein the first logic comprises input logic of the bus interface and the second logic comprises output logic of the bus interface.

* * * * *